(12) United States Patent
Pasic et al.

(10) Patent No.: US 10,625,197 B2
(45) Date of Patent: Apr. 21, 2020

(54) SIEVE ARRAY AND PRECIPITATOR DEVICE AND METHOD OF TREATING EXHAUST

(71) Applicant: Ohio University, Athens, OH (US)

(72) Inventors: Hajrudin Pasic, Athens, OH (US); Khairul Alam, Athens, OH (US)

(73) Assignee: Ohio University, Athens, OH (US)

( * ) Notice: Subject to any disclaimer, the term of this patent is extended or adjusted under 35 U.S.C. 154(b) by 292 days.

(21) Appl. No.: 15/568,036

(22) PCT Filed: Apr. 21, 2016

(86) PCT No.: PCT/US2016/028606
§ 371 (c)(1),
(2) Date: Oct. 20, 2017

(87) PCT Pub. No.: WO2016/172321
PCT Pub. Date: Oct. 27, 2016

(65) Prior Publication Data
US 2018/0117519 A1    May 3, 2018

Related U.S. Application Data

(60) Provisional application No. 62/209,532, filed on Aug. 25, 2015, provisional application No. 62/150,494, filed on Apr. 21, 2015.

(51) Int. Cl.
*B01D 47/02* (2006.01)
*B01D 46/00* (2006.01)
(Continued)

(52) U.S. Cl.
CPC ....... *B01D 47/028* (2013.01); *B01D 46/0053* (2013.01); *B01D 47/02* (2013.01);
(Continued)

(58) Field of Classification Search
CPC .......................... B01D 47/028; B01D 46/0053
See application file for complete search history.

(56) References Cited

U.S. PATENT DOCUMENTS 3,815,336 A * 6/1974 Rigo ................. B01D 45/08
55/434.4

FOREIGN PATENT DOCUMENTS

| CN | 103056030 A | 4/2013 |
|---|---|---|
| DE | 549644 C | 4/1932 |

(Continued)

OTHER PUBLICATIONS

PCT Office, International Search Report issued in PCT/US2016/028606 dated Jul. 8, 2016, 22 pages.

*Primary Examiner* — Robert A Hopkins
(74) *Attorney, Agent, or Firm* — Wood Herron & Evans LLP (57) ABSTRACT

A vibrating wet precipitator is designed to remove particulates from particulate-laden hot gas. The precipitator includes an array of vertical wet cords stretched within a duct. The cords are tuned to vibrate due to the gas flow by controlling key parameters such as gas flow, velocity, cord length and diameter so that particulate collection and heat transfer efficiency are maximized. The cords are part of sieves. A plurality of these sieves are arranged to define a plurality of gaps, through which the exhaust flows. The sieves and thus the cords are space so that a vortex from a first cord affects an adjacent cord and subsequently cord. The particles are then absorbed in liquid, which can be passed through a heat exchanger filtered and subsequently reused. Preferably the cord arrangement is designed to allow the cords to vibrate at high frequencies, typically 10 to 100 Hz, to maximize particulate collection.

7 Claims, 9 Drawing Sheets

(51) Int. Cl.
*B03C 3/16* (2006.01)
*B03C 3/41* (2006.01)
*B03C 3/45* (2006.01)
*B03C 3/49* (2006.01)
*B03C 3/76* (2006.01)

(52) U.S. Cl.
CPC .................. *B03C 3/16* (2013.01); *B03C 3/41* (2013.01); *B03C 3/455* (2013.01); *B03C 3/49* (2013.01); *B03C 3/76* (2013.01); *B03C 3/763* (2013.01)

(56) References Cited

FOREIGN PATENT DOCUMENTS

| DE | 554643 C | 1/1933 |
|---|---|---|
| WO | 2016061290 A1 | 4/2016 |

* cited by examiner

SIEVE ARRAY AND PRECIPITATOR DEVICE AND METHOD OF TREATING EXHAUST

CROSS-REFERENCE TO RELATED APPLICATIONS

This application is a national phase entry of International Patent Application No. PCT/US2016/28606 filed on Apr. 21, 2016, which claims priority to U.S. Provisional Patent Application No. 62/209,532 filed on Aug. 25, 2015 and U.S. Provisional Patent Application No. 62/150,494 filed on Apr. 21, 2015, the disclosures of which are expressly incorporated by reference herein in their entirety.

TECHNICAL FIELD

The present invention relates generally to a precipitator device and method of treating an exhaust, and more particularly, to a plurality of sieves for treating an exhaust.

BACKGROUND

Traditional precipitators, such as electrostatic precipitators, and scrubbers are widely used for treating exhaust containing gaseous pollutants and/or particulate emissions. For example, industrial processes, such as power and heat generation, may generate environmentally harmful particulate and gaseous emissions that may remain suspended in the air. These emissions often present health hazards when inhaled by humans and animals. Also, the particulate emissions tend to settle on equipment and buildings and may cause discoloration or even interfere with the proper function of the equipment. As such, it is important to remove these particulate emissions from the exhaust.

The exhaust can be passed through a traditional heat exchanger for recovering thermal energy from the exhaust. After all, many industrial processes discharge exhaust into the environment at an elevated temperature and recovering this thermal energy provides for an opportunity to improve the efficiency of the industrial process. Industrial processes capable of discharging exhaust containing gaseous pollutants at an elevated temperature may also be fitted with a scrubber and/or a wet electrostatic precipitator ("wet ESP") to both remove gaseous pollutants, such as particulate emissions, and recover thermal energy. Wet electrostatic precipitators typically include a liquid, such as water, to capture both particulate and gaseous emissions as well as thermal energy, which may be directed through a heat exchanger for improved efficiency.

While electrostatic precipitators, scrubbers, and heat exchangers are generally known for use with industrial processes, the effectiveness of treating the exhaust has been limited, at least to some extent, by traditional design limitations and the wide variety of different components necessary for treatment. For example, electrostatic precipitators, scrubbers, and heat exchangers configured for treating exhaust typically require unique alloys and coatings that increase overall cost and limit available space. Thus, the amount of surface area available to any one of the precipitators, scrubbers, and heat exchangers is reduced and, similarly, reduces the effectiveness of the treatment. In addition, traditional wet electrostatic precipitators often produce a liquid mist that increases the likelihood of electrically shorting one or more electrodes, which also reduces its effectiveness for collecting particulate emissions.

There is a need for a device and method of treating an exhaust that improves treatment effectiveness, reduces complexity, reduces costs, and addresses present challenges and characteristics such as those discussed above.

SUMMARY OF THE INVENTION

The objective of this invention is to use an array of wet vibrating cords (cylinders or ropes) to capture particulates from a hot gas stream along with efficient energy recovery. When particulate-laden hot gas flows through an array of vertical wet cords, they tend to vibrate due to vortex shedding. In particular, the cords will have vibrations primarily perpendicular to the flow direction and less pronounced ones in the flow direction. In this invention, these vibrations are tuned towards a frequency band close to the natural frequency of the array of cords so that the vibrational velocities and accelerations are enhanced. With increased vibrational velocity and acceleration, particulate capture is increased with dramatic enhancement in energy and mass transfer. This array of wet vibrating cords thus functions very efficiently as a particulate capture and energy recovery instrument.

The objective of this invention is to tune these vibrations in a frequency band as close as possible to the natural frequency of the array of cords so that the vibrational velocities and accelerations are enhanced. Higher cord accelerations and higher vortex-shedding frequencies mean higher interacting forces between the gas flow and the cords. With increase in vibrational velocity and acceleration, there is enhancement in particulate capture. In addition, there is increase in heat transfer and dramatic increase in transfer of the water vapor and wet liquid droplets between the wet cords and the flowing gases from which most of needed water is extracted. The particle size is increased when the gases are supersaturated by cooling down and condensation occurs on the particles. There is also addition of droplets to the high velocity gas stream by shearing off from the water film on the cords. Therefore, this array of wet vibrating cords can be used to perform the following functions:

(A) as a particulate capture instrument due to (I) high impaction efficiency (I) particle growth, (ii) increase in turbulence shear (iii) generation of water droplets that act as a scrubber for the particles, and (iv) increased evaporation and condensation of water on the particles.

(B) as an energy recovery instrument due to (i) high heat transfer (ii) increase in turbulence shear (III) generation of water droplets that act as a scrubber, and (iv) increased evaporation and condensation of water on the cords.

(C) as a scrubber for gases and vapors due to the scrubbing action of the water film on the cords and the wet particulates, and the scrubbing by the water droplets generated by shearing action of the high velocity gases on the vibrating cords.

This technology can be combined with any precipitation setup using electrical charging of particulates and installed downstream. But both units need to be fine-tuned to achieve the best result. If not fine-tuned, the cords will still vibrate and will still contribute to the particulate capture to a certain degree, but not nearly as much as if tuned; this is the key feature of this invention.

Since this technology is inexpensive and has large particulate collection efficiency even without using electric power, i.e. its application is simple and safe, it could find wide residential and commercial uses. The following sections provide details on the effect of vibrations on particulate capture, heat transfer, energy recovery and particle growth.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain the invention.

DETAILED DESCRIPTION

Figure 1A:
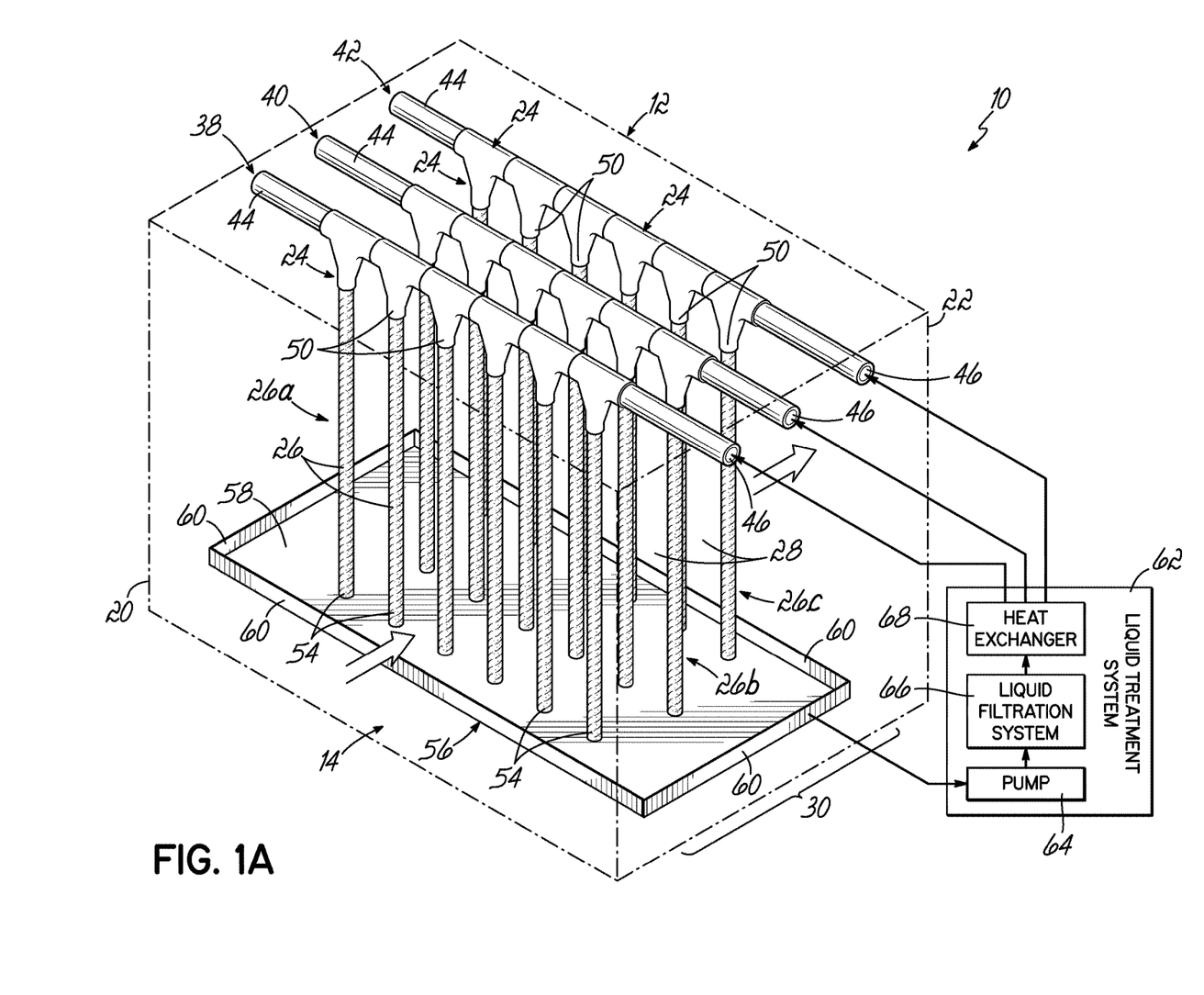
FIG. 1A is a perspective view of a first exemplary embodiment of a device for treating an exhaust having a plurality of sieve assemblies.
Figure 1B:
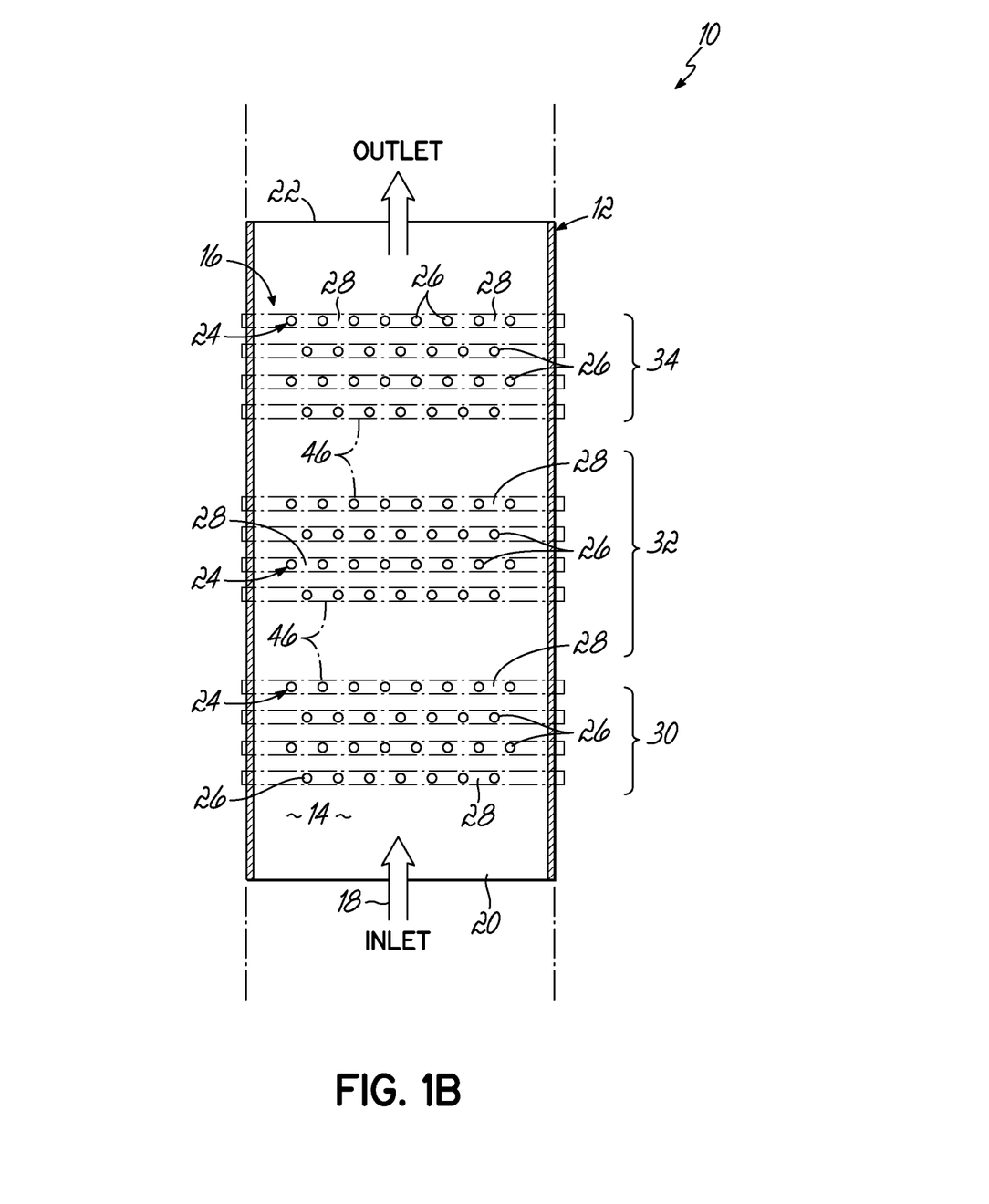
FIG. 1B is an overhead plan view of the apparatus of FIG. 1A in a duct.

In the vibrating wet precipitator 10 (VWP) shown in FIGS. 1A and 1B, particulate-laden hot gas flows through an array 30 of vertical wet cords 26 stretched within duct 12. The cords 26 are tuned to vibrate due to the gas flow. In particular, the cords 26 will have vibrations perpendicular to the flow direction and to a minor degree in the flow direction too. By controlling the key parameters, such as gas flow velocity, cord length and diameter and its physical properties, as well as cords' spacing, amount of cleaning water, particle collection and heat transfer efficiency are maximized.

FIGS. 1A and 1B shows an exemplary embodiment of precipitator device 10 with the plurality of cords 26 fixed at top and bottom with a desired tension. There are three rows of cords labeled 26(*a*), 26(*b*) and 26(*c*) which are part of sieves 38, 40 and 42, respectively. As discussed briefly above, the plurality of sieves 24 are arranged to define the plurality of gaps 28 through which the exhaust flows from a duct inlet 20 to a duct outlet 22 with like numbers indicating like features discussed above. According to the exemplary embodiment, the elongated cord 26 is in the form of a rope having primarily but not necessarily circular cross section. However, it will be appreciated that alternative materials and structures that vibrate may be so used.

The sieve assembly 16 includes first, second, and third sieve arrangements 38, 40, 42, respectively. Each of the sieve arrangements 38, 40, 42, includes sieves 24 offset and parallel from each other along a linear row. The plurality of sieves 24 are oriented generally vertically/longitudinally and, as such, perpendicular to the transverse flow direction of the exhaust. While the sieves 24 are distributed about the flow chamber 14 generally evenly to define like gaps 28, it will be appreciated that more or less sieves 24 may be used with varying orientation and placement within the duct 12.

Figure 4A:
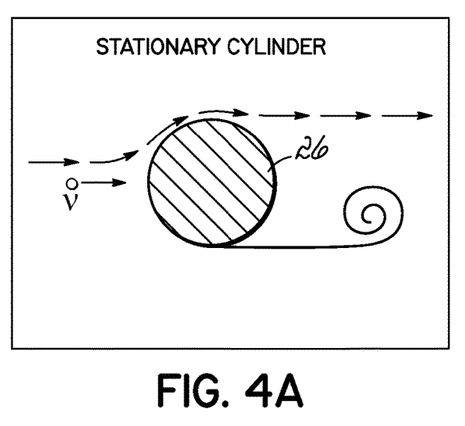
FIG. 4A is a diagrammatic depiction of a stationary string and a vibrating string showing the straight line motion of the vortices shedding off the stationary cylinder.
Figure 4B:
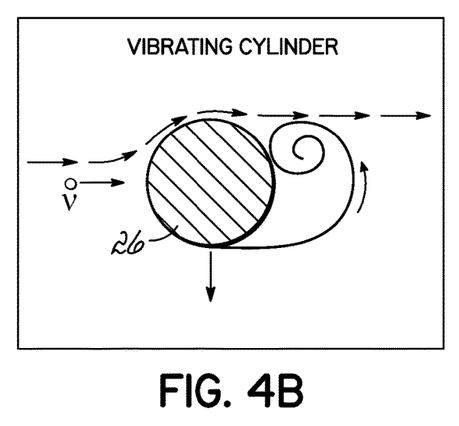
FIG. 4B is a diagrammatic depiction of a plurality of vibrating cords showing the cylinder vibrating in one direction with the vortex swayed in the opposite direction; in the next vibrating cycle, the motion directions of the cylinder and the vortex are changed
Figure 4C:
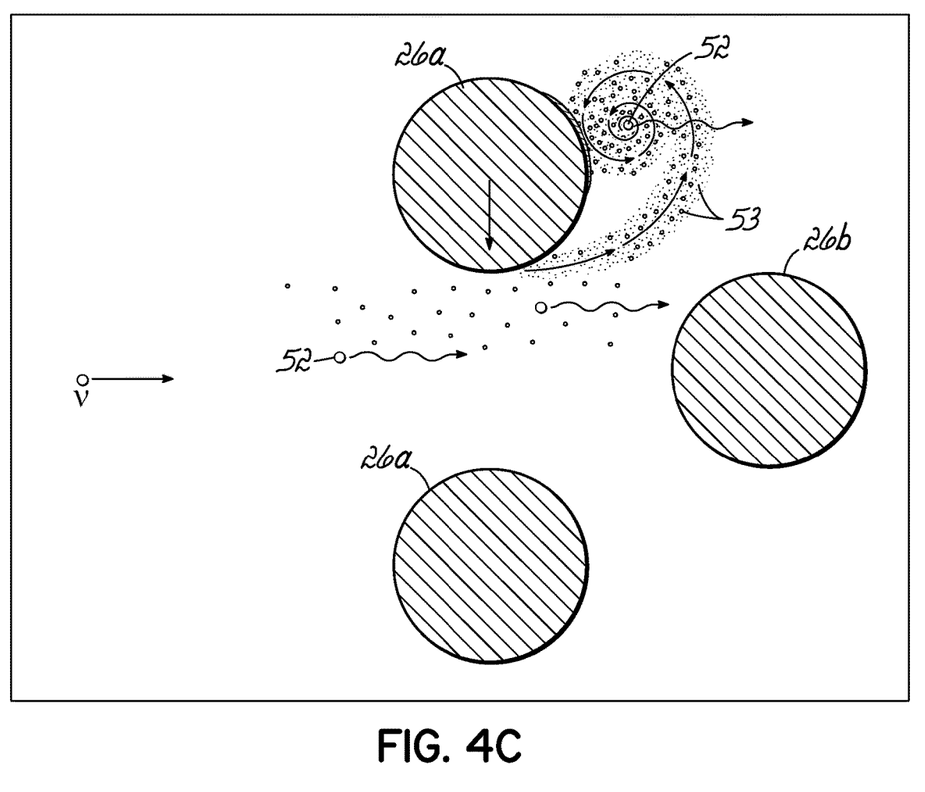
FIG. 4C is a diagrammatic depiction showing the capture of big particles by impaction and the capture of small particles flowing close to the vibrating cylinders and taken by the swayed vortices and captured on the back of wet cylinders.
Figure 5A:
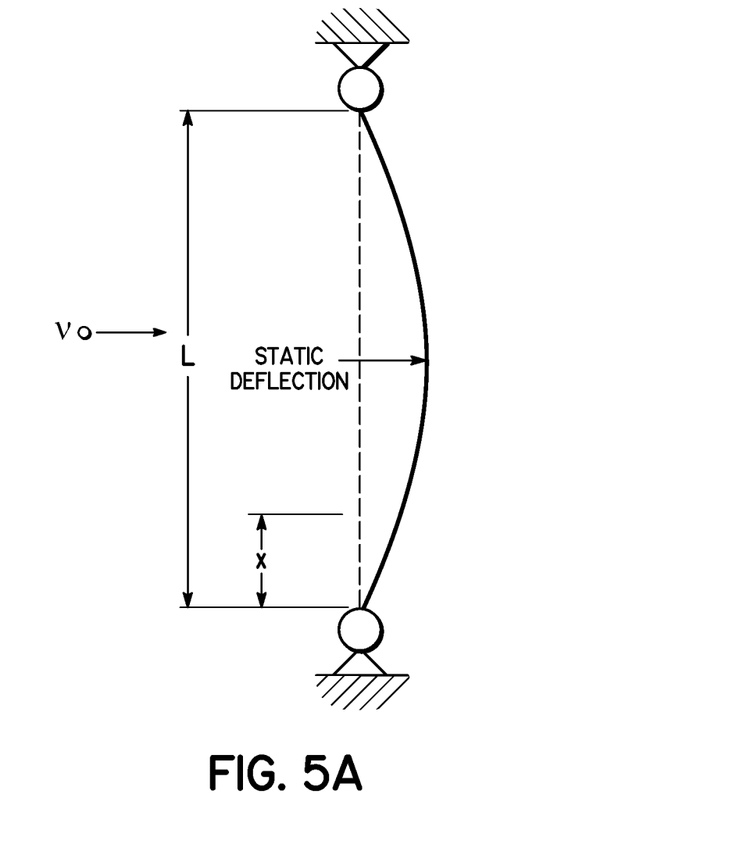
FIGS. 5A and 5B are diagrammatic depictions of a vibrating string.
Figure 5B:
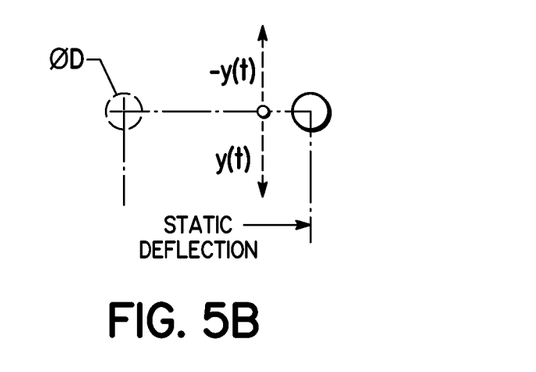
Figure 6:
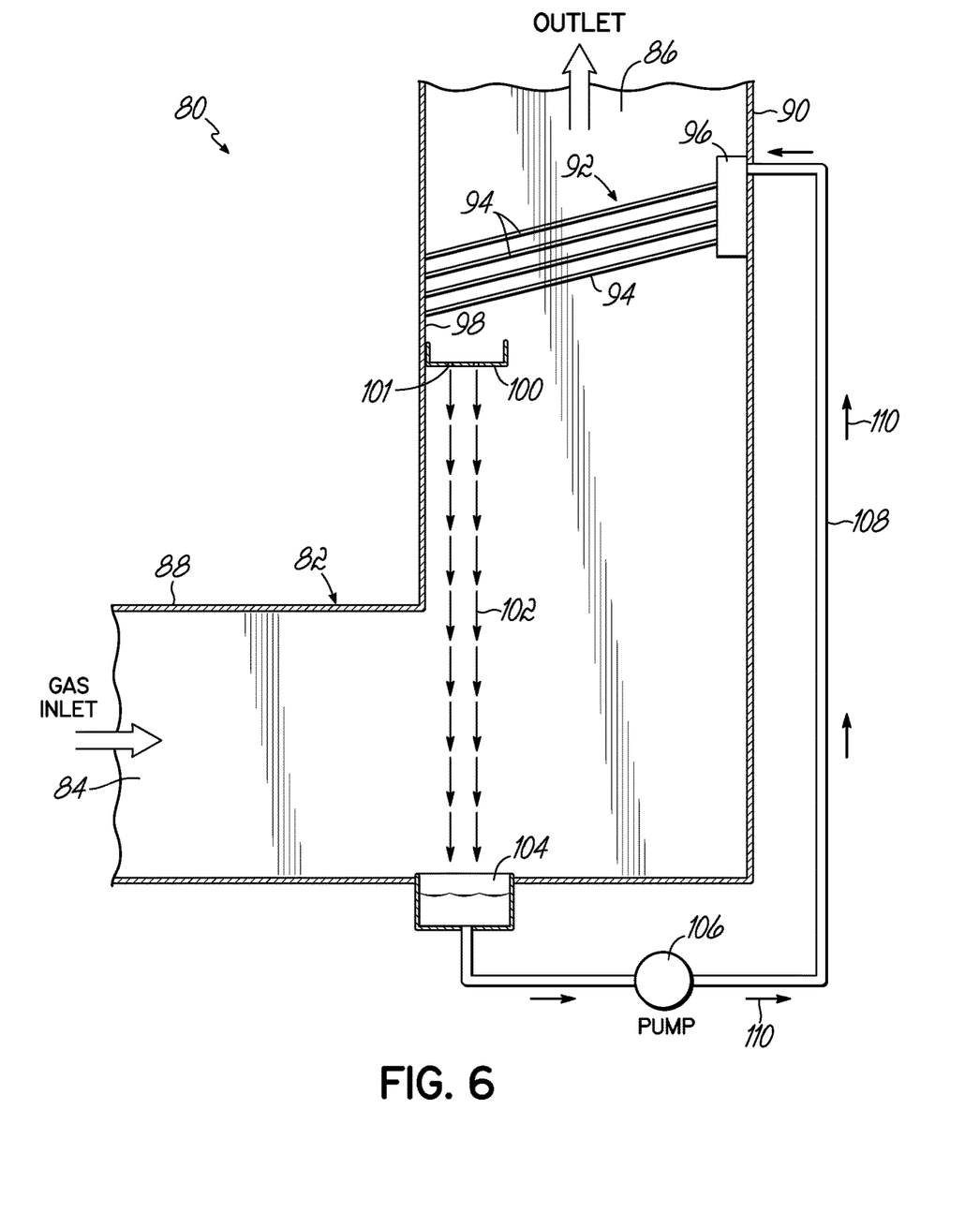
FIG. 6 is a side cross-sectional view of an alternative embodiment of the present invention.
Figure 7:
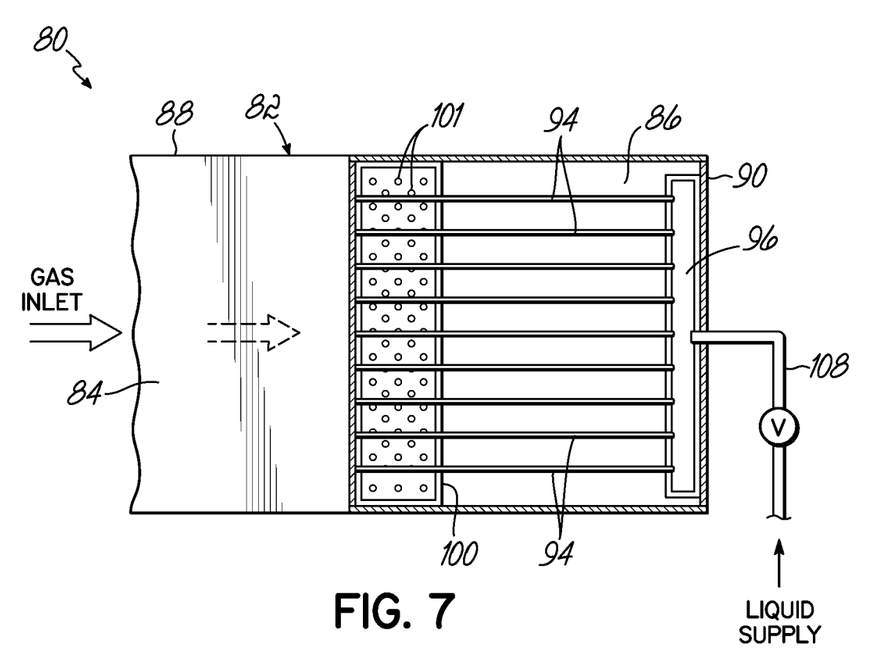
FIG. 7 is an overhead cross-sectional view of the embodiment shown in FIG. 6.

Preferably, the sieves and thus the ropes 26(*a*) through 26(*c*) are spaced so that a vortex from a first rope 26(*a*) affects adjacent rope 26(*b*) and subsequently rope 26(*c*) etc. as shown in FIG. 4B.

Each sieve arrangement 38, 40, 42 includes the generally horizontally extending support member 44, which defines a liquid supply conduit 46 extending therethrough. The support member 44 supports the generally vertical orientation of the elongated cords 26 and is configured to introduce the liquid therein to define a sieve inlet 50. According to the exemplary embodiment, the support member 44 and the liquid supply conduit 46 are in the collective form of a single elongate tube; however, it will be appreciated that many other designs for supporting the sieves 24 and providing for the supply of liquid to the sieve inlet 50 may be so used.

According to the exemplary embodiment, the sieve inlet 50 and a sieve outlet 54 are positioned at opposing end portions of the elongated cords 26. However, it will be appreciated that the sieve inlet and outlet 50, 54 may alternatively include or additionally include further structures, which may define, respectively, the inlet and outlet.

The vibrating wet precipitator device 10 further includes a liquid collector 56 positioned proximate to the sieve outlets 54 for collecting the liquid being discharged from the sieve outlets 54. In addition, the elongated cords 26 connect to the liquid collector 56 as another frame member 56. As such, the elongated cords 26 extend between the frame members 44, 56 and are configured to vibrate therebetween.

The elongated cords 26 are more particularly configured to vibrate by passing the flow of the exhaust transversely therealong. Alternatively, the elongated cords 26 may be operatively connected to a vibration mechanism configured to actively vibrate the elongated cords 26 during use.

The liquid collector 56 is in the form of a tray 56 that includes a bottom 58 and surrounding sidewalls 60 configured to guide the liquid to a liquid treatment system 62. The liquid treatment system 62 includes a pump 64, a filtration system 66, and a heat exchanger 68. The pump 64 is configured to direct the liquid from the liquid collector 56 to the filtration system 66, which is configured to remove particulate emissions from the liquid. The pump 64 then continues to direct the liquid through the heat exchanger 68 for recovering thermal energy from the liquid. While the liquid may be removed from the precipitator device 10, the liquid may also be redirected back into the liquid supply conduit 46 for reuse through the elongated cords 26, as illustrated schematically in FIG. 1. It will be appreciated that the pump 64, filtration system 66, and heat exchanger 68 may be selected and assembled in order to accommodate any performance requirements for treating the exhaust of any given industrial process. For this reason, the pump 64, filtration system 66, and heat exchanger 68 may be selected and assembled per known requirements readily appreciated by those having ordinary skill in the art.

FIG. 1B shows an exemplary embodiment of a vibrating wet precipitator having three arrays 30, 32 and 34 of cords 26. The number of arrays, as well as the number of cords per array, can be modified to maximize collection efficiency.

Figure 3A:
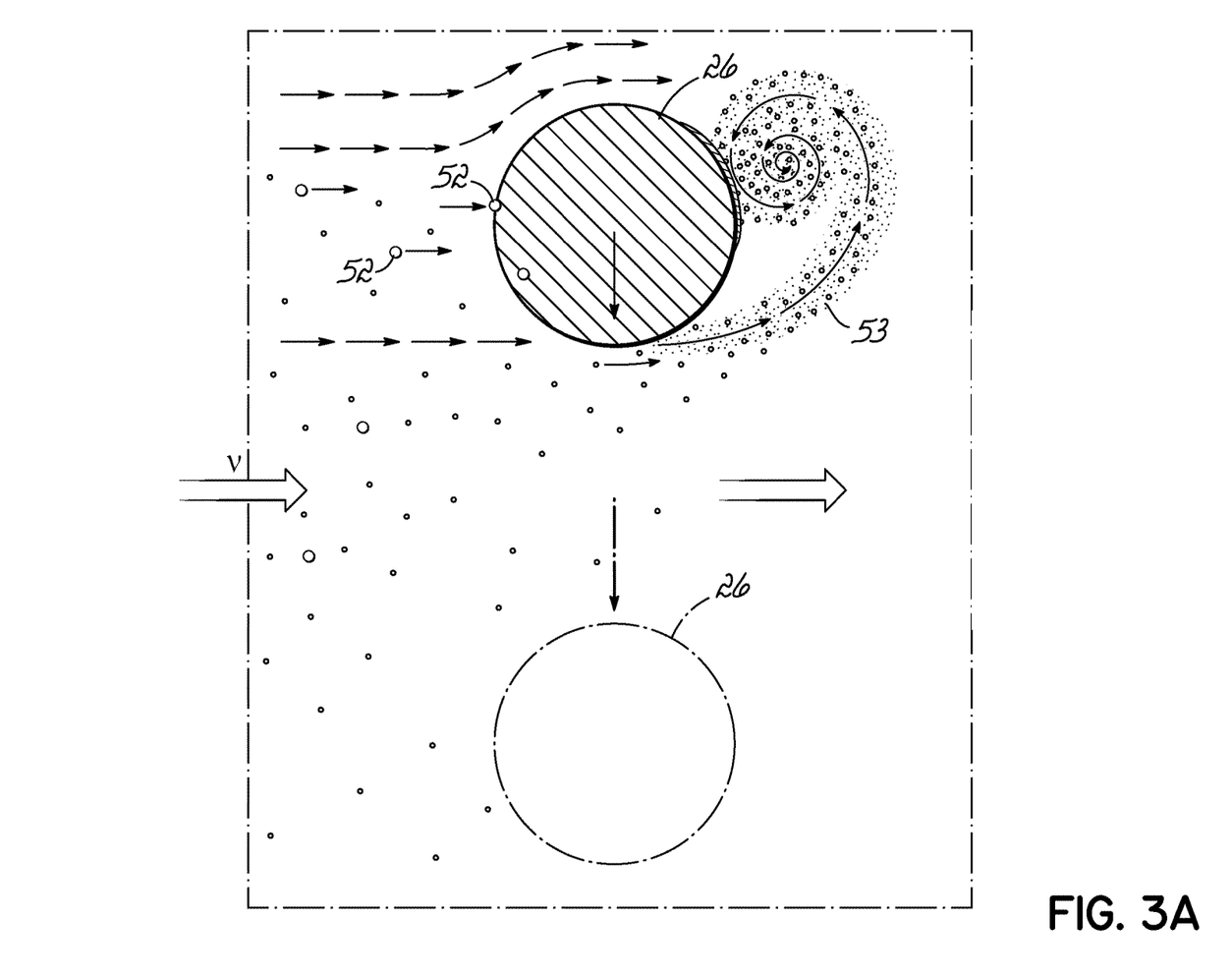
FIG. 3A is a top sectional view of an exhaust flowing along a sieve of the sieve assembly shown in FIG. 1A with the sieve in an initial transverse position.
Figure 3B:
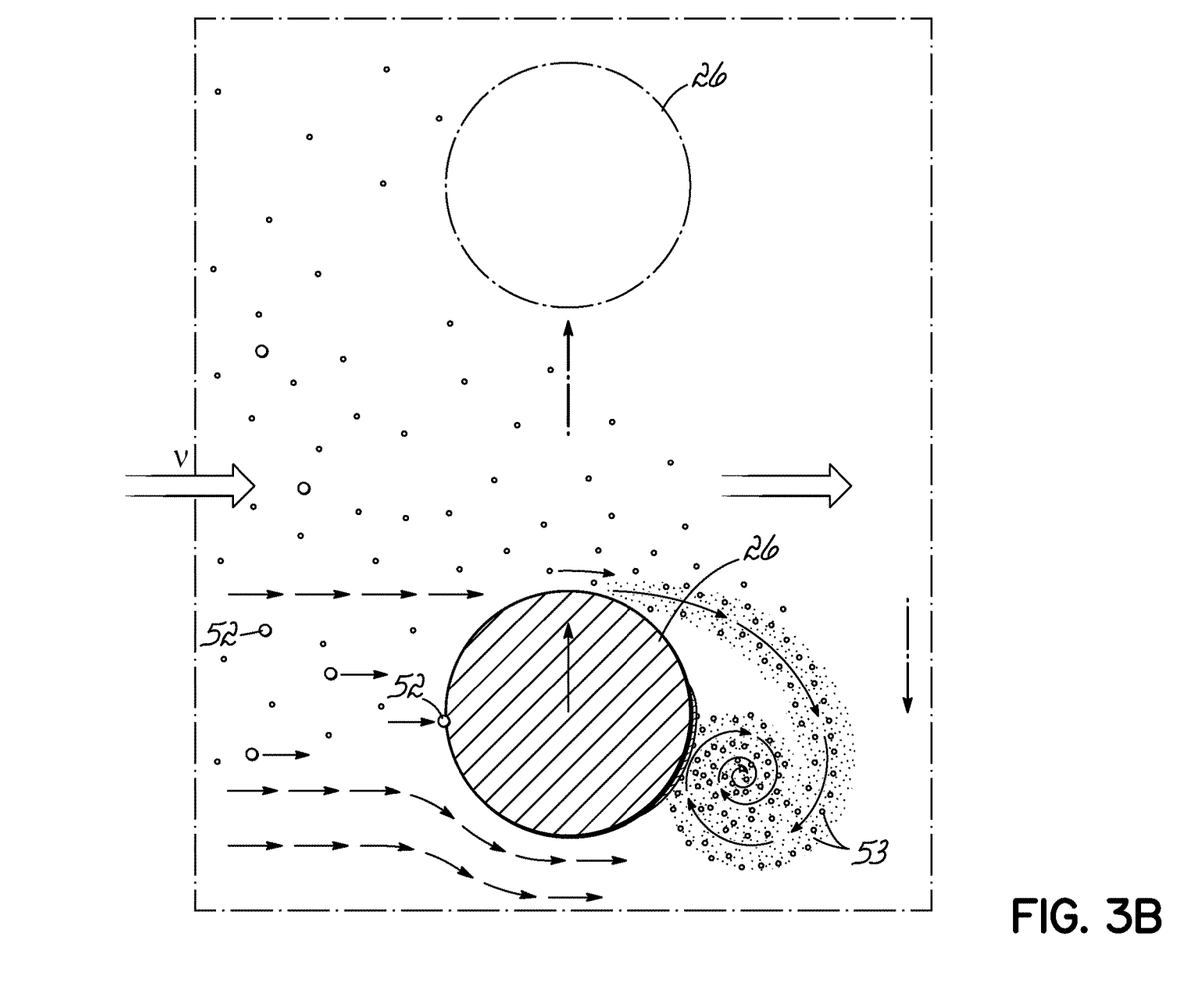
FIG. 3B is a top sectional view of the exhaust and the sieve similar to FIG. 3B, but showing the sieve in a terminal transverse position.

In use, as shown in FIGS. 3A-3B and FIG. 4B, the flow of the exhaust forces the elongated cord 26(a) to vibrate between the first and second positions. Relatively large particulates 52 impact the elongated cords 26(a), which collect these particulates thereon. However, the relatively small particulates 53 tend to follow the flow of the exhaust around the vibrating elongated cords 26(a). To this end, the elongated cords 26(a) generate the trailing vortices and effectively capture and collect the smaller particulates within each trailing vortex. The vortices from cords 26(a) will impact cords 26(b) which, in turn impact cords 26(c), all of which will be vibrating as shown by FIGS. 3A and 3B. The relatively small particulates impact with each other and coalesce into larger particulates that also impact the elongated cords 26(a)-26(c) for removal. The beneficial flow turbulence is further enhanced by smaller-amplitude vibrations of the ropes in the flow direction; these vibrations have two times higher frequencies than those in the lateral direction. The liquid flowing along the elongated cords 26 may then gather the particulates and direct the particulates to the tray 58 for removal by the liquid treatment system 62.

Contrary to conventional electrostatic precipitators, particulate capture efficiency is expected to be higher at higher gas velocities and accompanying high vibrational velocities and accelerations of the cords, caused by higher vortex-shedding frequencies, and particles are more likely to deposit by impaction at high relative velocities and acceleration. Hence dimensions of the vibrating precipitator could be decreased and the cords could be mounted even in the existing ducts, instead of expanding ducts to reduce flow velocities, like in conventional electrostatic precipitators.

Increasing the size of the particles is very effective means for improving the collection by impaction. Particle growth can occur by collision and coagulation or by condensation of water from the gas stream. The turbulent shear due to the high flow velocity and the perturbations by the cords which vibrate and detach vortices with very high accelerations will produce high collision rates due to high forces exerted by the ropes on the water flowing down them, so that particle growth rates become significant feature of the vibrating precipitator.

Small size particles are difficult to capture by impaction even though the velocity in the vibrating collector is high. However, they can be captured by small droplets of water that are generated by vibrating cords in the high velocity gas. It is known that the collection efficiency of small droplets of water have high efficiency for collecting particles from a flow of gases. It should be noted that spray chambers are used for particulate removal (scrubbing). The taut cords vibrating at very high acceleration exert large forces on water film flowing down them and generate a spray chamber environment similar to that in scrubbers and suitable for capture of very fine particulates.

Effect of Cord Vibration on Particulate Capture:

Although cylindrical cords tend to vibrate in a cross flow with a very small amplitude, the present invention utilizes high frequency vibrations, typically with frequencies in the range of 10-100 Hertz. As a consequence, vibration velocities and accelerations of cords are very high. Fundamental transverse vibrations are especially pronounced when vortex shedding frequency locks onto the cord natural frequency (see FIGS. 3A and 3B). It happens over the range $4 < v/(f_n D) < 8$ where, v is gas velocity, D is the cord diameter and $f_n$ cord's natural frequency, which depends on cord tension and its length and unit mass. As explained below, smaller vibration also occurs out of that range. Given gas flow conditions, there is a lot of room for cords' tuning to produce desired vibration amplitudes and frequencies buy changing their length, tension force, specific weight, including changes in the cross section shape. Laboratory tests show that the particulate collection efficiency is significantly reduced if the cords are not adjusted and tuned to specific flow and dust loading parameters.

Together with higher vortex-shedding frequencies produced at elevated flow speeds, these high vibration frequencies will produce additional turbulence that breaks up the boundary layer on the wet cords, and increase both diffusional deposition of particles as well as impactions due to the high vibrational velocity/acceleration of the cords. The impaction process is determined by the relative velocity between the particle and the cord. The vibrational velocity and the flow velocity together produce a higher effective velocity Stokes number which results in higher rates of impaction as explained below. This can increase particulate capture with or without need of charging it, leading to either significant reduction of the electrical power or even its complete elimination, i.e. exclusion of transformer/rectifier units, discharge electrodes, and the corresponding control equipment, maintenance etc.

Migration velocity is the key parameter on which ESP efficiency depends. In conventional ESPs it is very small, typically only 0.02-0.08 m/s. depending on dust properties in various industries. They are the main cause of low ESP efficiencies. In the present invention, these velocities are increased, not by moving particles faster towards the wet cords but because the cords are moved fast towards the particles. And for producing such a speed, charging particulate would help but it is not a requirement.

To increase particulate capture efficiency, cords are kept wet by a supply of fluid (typically water but not excluding other media) at the top. Cords can be made from a number of materials that could be both hydrophilic and hydrophobic, because continuous cord vibrations will smooth the fluid flow along them. In absence of a high-voltage field, water droplets can be allowed to shear off without creating short circuits like in conventional electrostatic precipitators, thus producing better particulate capture by scrubbing action. Thus, when no charging electrodes are used, hydrophobic cords can be employed. Whereas hydrophilic cords are preferred with an ESP, i.e. when the particulate is charged.

In case of a bundle or array of cords (FIG. 1) with several rows of cords being in the wake of each other these transport processes are more complicated and depend on longitudinal and transfer pitches. The collection efficiency of an array of cords of diameter D with a longitudinal pitch of $S_L$ in the flow direction, and a transverse pitch of $S_T$ can be calculated as:

$$\mathit{Eff}(N \text{ rows}) = 1 - \left[1 - \frac{\eta}{S_{Tn} - \frac{\pi}{4S_{Ln}}}\right]^N$$

Where N=number of rows, $S_{Tn}=S_T/D$, $S_{Ln}=S_L/D$ and the single cord (cylinder) efficiency ($\eta$) is based on the transport process (e.g., impaction, diffusion, etc.). The array can be designed on the basis of the above equation for optimum particulate transfer.

Heat Transfer

Heat transfer from the gas to the water flowing down the cords is significantly increased by cords' vibration; this heat flux is enlarged by increasing both vibration amplitudes and frequencies as well as by decreasing the cord diameter. Since geometry of cords (length, diameter, cross section shape) and their physical properties (material used, tension applied) can be changed/adjusted, so will be this amount, as well as the amount of dust collected. It is known that at each point on the cord surface the heat transfer depends on local temperature and the temperature and velocity of the boundary layer. The total heat flux is proportional to the total surface area of the cord and the local heat transfer coefficient. Heat transfer is best enhanced if the cord is oscillating near the Strouhal frequency.

High heat transfer coefficients are particularly present at high-amplitude and high-frequency vibration and especially at the trailing half of the cord where the influence of the vortex rollup process is most pronounced This corresponds to regimes in which v/f D (f is cord's frequency in Hz) and for the amplitude/diameter ratio A/D<0.8. In this regime vortices formed behind the cords have short formation length (they form very near cord surface) and are therefore effective in heat and mass transfer.

In case of a bundle of cords with several rows of cords being in the wake of each other, there are several studies that provide the heat transfer to an array of stationary cylinders. The effect of cord vibrations is to produce vortices closer to the cylinder and heat transfer is enhanced if the vortex is swayed by vibrations close to the cylinder (FIG. 4A). The heat transfer can now be optimized by adjusting the pitch of the cylinders and the vortex formation length so that the vortex affects multiple adjacent cylinders (FIG. 4B).

Water Vapor Transport

An important effect of wet cord vibration is the tremendous increase in the transport of vapor from the cords. The ratio of the mass transfer coefficient from a vibrating wet cylinder to stationary wet cylinder is given by:

$$\frac{k_V}{k_{st}} = 0.117[4Af(2A+D)/v]^{0.85}$$

Where $k_v$ is the mass transfer coefficient for the vibrating cord and $k_{st}$ is the mass transfer coefficient for the stationary cord, A is the amplitude, D is the diameter and v is the kinematic viscosity. This equation was proposed by R. Lemlich and M. R. Levy (AlChE Journal, Vol 7, p. 240, 1951) based on their experiments in which they were able to get 660% increase in mass transfer.

Therefore, the effect of the wet cord vibration will be to immediately saturate the gas stream when it enters the cord array. Simultaneously, the heat transfer process will cool down the gases and the flow will become supersaturated with water vapor which will condense on the particles surfaces and the wet cords. It can be shown the condensational growth of particles will occur very fast, and hence increase their capture by impaction as described below.

Generation of Water Droplets

The combination of high vibration frequency, velocity and especially high accelerations of the wet cords and high velocity of the gas stream can be expected to generate droplets that shear off from the water film on the cords. The size of the droplets can be adjusted by the surface texture of the cord and their size will also depend on the shear forces on the water film, and in the vortices induced by the flow. These droplets are very efficient in capturing fine particulates by Brownian motion and by turbulent shear.

Therefore, the vibrating precipitator can function as a spray chamber to capture particulates from the gas stream.

In order for the evaporation and condensation processes to occur within a system, the design would include an initial array of wet cords with sufficient water supply that can saturate the gas by vapor transport. In this section, the biggest particles will be captured by impaction.

There would then be a middle array where the gases would have cooled down sufficiently to start the condensation on the particles and the wet cords. In this section the smaller particles will grow, and can participate in scrubbing of toxic vapors or gases. The cross sectional area of the VWP can be increased in this section to increase the residence time for condensation and scrubbing.

In the final section the particles would be captured by impaction on the array of wet cords from a high velocity gas stream. More condensation of water will occur; and the total condensation will contribute to the heat transfer from the hot gases. It should be noted that the wet strings will act as a scrubber throughout all the sections.

Flow-Induced Vibration

With reference to FIGS. 5A and 5B, for elastically supported string/rope of length L vibrating in the y-direction perpendicular to the gas/fluid flow, displacement is described by the differential equation (R. D. Blevins: Flow-Induced Vibration, Van Nostrand Reinhold, New York, 1990):

$$m\ddot{y}+2m\xi\omega_n\dot{y}+ky=\tfrac{1}{2}\rho_G v^2 DC_L \sin\omega_v t \tag{1}$$

whose solution is:

$$y(t)=A\cos(\omega_v t-\phi) \tag{2}$$

where amplitude A is $$A=\frac{\frac{1}{2}\rho_G v^2 DC_L}{k\left[\left(1-\left(\frac{\omega_v}{\omega_n}\right)^2\right)^2+\left(2\xi\frac{\omega_v}{\omega_n}\right)^2\right]^{1/2}}, m \tag{3}$$

and other quantities are:

- $\ddot{y}$, $\dot{y}$—acceleration ($m/s^2$)and velocity (m/s)
- $\rho_G$—gas density, $kg/m^3$
- $\xi$—structural damping; for many objects is 1%-3%, i.e.$\xi\cong$0.01-0.03 and it can be easily experimentally determined
- $v$—gas velocity, m/s
- D—string diameter, m
- $C_L$-dimensionless lift coefficient; for circular cylinders in a wide range of Reynolds numbers $C_L\cong 1$
- $\omega$—natural frequency of the string, 1/s $$\omega_n=\frac{\pi}{L}\sqrt{\frac{T}{m}}=\sqrt{\frac{k}{m}} \tag{4}$$

- L—length of string, m
- T—tension in the string, N
- m—unit mass of the string, kg/m
- k—stiffness $\phi$-phase
- $\omega_v$—vortex shedding frequency, 1/s $$\omega_v = 2\pi \frac{Sv}{D} \quad (5)$$

S—dimensionless Strouhal number; for circular cylinders S≅0.2

In case of flow between a set of parallel cylinders, the Strouhal number in (5) is based on the largest average velocity between the cylinders. If that opening is h, using conservation of mass:

$$\omega_v = 2\pi \frac{Sv}{D} \frac{D+h}{h} \quad (6)$$

From (2), vibration velocity is $$v = \frac{dy}{dt} = -A\omega_v \sin(\omega_v t - \phi) \quad (7)$$

such that the maximum velocity and the maximum acceleration in the direction perpendicular to the gas flow are $$v_{max} = A\omega_v, m/s \quad \alpha_{max} = A\omega_v^2, m/s^2 \quad (8)$$

Velocity is therefore proportional to the vortex shedding frequency, while acceleration can be very large because it is proportional to the square of that, otherwise high frequency. Natural frequency of the cord is of the order of 10^2 rad/sec, while the vortex-shedding frequency is several times higher. Given gas flow conditions, gas flow speed in particular, Eq. (4) explains what needs to be done to increase the natural frequency of the cords towards vortex-shedding frequency. At lower gas velocities, in order to increase the natural frequency, the effective length of the cords can be reduced by a) restraining cords motion not only at its ends but also at one or more locations in between, or b) by suspending several shorter cords (with their own water supply systems) instead of using a single long cord.

For cords suspended at the ends only, Eq.s (7), (8) refer to the middle point of the vibrating string x=L/2, while at any other point $$y(x, t) = A \sin\left(\frac{\pi}{L} x\right) \cos(\omega_v t - \phi), \, 0 \le x \le L$$

Consequentially, the largest displacements and velocities are near the middle of the string and are gradually decreasing towards the two ends.

It is reasonable to assume that migration velocity of a particle passing between vibrating cylinders (which vibrate in a direction roughly perpendicular to the particle's path) on which it needs to be deposited is proportional to the velocity (7). Due to large inertia, bigger particles will be less swayed by the flow (displaced by moving cylinders) while small particles will adjust to the flow.

Typical values of cord diameters are 1-5 mm, tension force 100-1000 N, cord lengths 0.5-3 m, the wet-cord weight about 5-100 grams, and gas velocities ranging 3 to 30 m/s.

Particle Growth by Collision, Coagulation and Condensation

Particulate matter suspended in gases can grow in size by several means. For the Vibrating Precipitator, two modes can be expected to dominate: collision/coagulation and condensation.

Collision and coagulation occurs when particles come in contact with each other and agglomerate. In analytical treatments of conventional ESPs, it is assumed that the particles in the suspension are sufficiently separated so that their interaction can be neglected. The primary reason for this is that the viscous forces of the gases between the particles prevent particles from colliding like gas molecules, and the viscous force must be overcome by the van der Waals forces for collisions to take place (Ref: M. K. Alam, "The Effect of Van Der Waals and Viscous Forces on Aerosol Coagulation," Journal of Aerosol Science and Technology, Vol. 6, pp. 41-52, 1987).

The rate of particle collisions in a gas medium has been analyzed by many researchers, and it has been shown that the collisions can take place due to shear in the fluid flow. The significance of collision and coagulation in the gas stream can be evaluated by comparing the characteristic time (or time constant) for coagulation, which is given by (ref: S. K. Friedlander, "Smoke, Dust and Haze, Fundamentals of Aerosol Behavior, Wiley, New York, 1977).

$$\tau = \frac{2}{KN_d} = 3\mu/(4kTN_d),$$

where μ is the dynamic viscosity, K is the collision rate, k is the Boltzmann's constant, T is the temperature and $N_d$ is the number concentration of particles.

For turbulent shear, the collision rate and growth is controlled by turbulent energy dissipation which has been measured in the wake of cylinders (Ref: X. Zhang, W. Zhong, J. Yang and M. Lou, "Dimensional Analysis and Dissipation Rate Estimation in the Near Wake of a Circular Cylinder, Journal of Applied Mathematics and Physics, Vol 2, pp 431-436, 2014). The characteristic time is much less than 1 second in the vortex when gas flow rate is about 16 m/sec with typical particulate concentration of 3 g/m3 in the ESP. Therefore, turbulent shear will contribute to particle growth.

Condensation will take place on the particles when the gas stream becomes supersaturated. In the array of wet cords this will happen very quickly because the vibrating cords will produce moisture at a high rate if the gas is under-saturated. There are also high heat transfer rates because of the vortex shedding by the vibrating cords which cools the gases. As the particle-laden gases move through the array, they will grow by condensation according to the equation (see Friedlander):

$$\frac{dd_p}{dt} = \frac{4Dv_m(P_g - P_d)}{kTd_p^2}$$

Where $d_p$ is the particle diameter, D is the diffusion coefficient, $v_m$ is molecular volume of water, $(P_g-P_d)$ is the water vapor pressure difference between the gas stream and the particle surface. For a typical combustion flue gas cooling down to about 40° C. with approx. 15% water vapor, the growth time is of the order of milliseconds for particles smaller than 5 microns. From the above equation, it is also obvious that smaller particles will grow even faster. Therefore, condensational growth will greatly increase the particle size in the vibrating wet precipitator.

Particulate Capture by Diffusion, Interception and Impaction Particulate capture is the goal the vibrating wet precipitator 10. Without vibration, the capture becomes significant only for bigger particles (bigger than 1 micron). The vibration of the wet cords changes the gas flow patterns significantly—the turbulence intensity is increased around the vibrating string, while the relative velocity between the string and the particles also changes. These phenomena produces enhancement in particulate capture through the following mechanisms:

(i) Convective Diffusion: Since the flow is expected to be turbulent, the collection efficiency is a function of the Reynolds number and the Schmidt numbers. Research has shown that the particulate capture by filter fibers is enhanced by the vibration Reynolds number (calculated on the basis of the vibrational peak velocity) which leads to increased diffusion intensity around the cylindrical fibers. For a vibrating string with frequency f (Hz) and amplitude A, the vibrational Reynolds number ($Re_v$) and the vibrational velocity (maximum) is given by:

$$Re_v = \frac{U_v D}{v},$$

and Vibrational velocity $V_v = 2\pi f A$

Research by Kim et al. (Ref: S. C. Kim, H. Wang, M. Imagawa and D. Chen, "Experimental and Modeling studies of the Stream-wise Filter Vibration effect on the Filtration Efficiency", Aerosol Sci. and Tech., 40:389-395, 2006) on fibrous filters demonstrated up to 60% increase in capture efficiency with velocity as small as $V_v = 0.03$ m/s The vibrational velocity for the Vibrating Precipitator can be quite high; for an amplitude of 1 mm and a frequency of 2000, this value is $V_v = 26$ m/s. Therefore, high capture efficiency by convective diffusion can be expected.

(ii) Impaction: Particulate capture by impaction in turbulent flow is primarily determined by Stokes number (Stk), defined by $$Stk = \frac{\rho_p d_p^2 C_c U}{9 \mu D}$$

Where U is the gas flow velocity, D is the diameter of the string, is the kinematic viscosity of the gas, and $C_c$ is a correction factor (Ref: P. Douglas and S. Ilias, "On the Deposition of Aerosol Particles on Cylinders in Turbulent Cross Flow", J. Aerosol Science, Vol 19 (4): 451-461, 1988). The efficiency of capture goes up rapidly with Stokes number. In a vibrating array of cords, the Stokes numbers increases by the following mechanisms:

(a) The velocity U is now the resultant velocity of the gas stream and the vibrational velocity. Therefore, the particles are much more likely to impact the string. Another way of looking at the mechanism is that the vibration increases the interception area since the particle moves perpendicular to the vibrational velocity.

(b) The Stokes number is also increased by particle size growth by coagulation due to the turbulent shear in the vortex behind each string, and (c) The condensation of supersaturated gas stream as it moves through the array of wet cords increases the particle size and thereby its impaction efficiency.

EXAMPLE

A bench-scale test unit consisting of a 12 foot long inlet, 4 foot outlet and 2 foot long test section between the two. The test section houses two or eight 1-inch thick sieves, set three inches apart. Each sieve consists of 30 polypropylene 5-mm ropes (actually it is a single rope, which is looped through holes) distanced 10 mm center to center, occupying 30×12-inch space with the total area of 360 square inches=0.23 square meters. Ropes in the neighboring sieves were aligned, not staggered, In order to be able to apply variable tension force to the rope(s), on top a single rope is looped through holes in a thick hollow beam which could move up or down. Tension in the rope(s) was 25, 35 or 45 pounds.

PVC pipes were used to deliver water running down the strings. The amount of water used in all tests was 0.75 liters per minute per cell, in all cells.

The 3-micron fly ash with concentration ranging from 30 to 70 mg/m^3 was injected into air at the inlet using SCHENK AccuRate type MOD102M dust feeder.

All tests were conducted at room temperatures with air velocity of 25 ft/s at inlet. The air/gas was drawn by the outside fan.

Fly ash collection efficiency was measured using two Thermo Scientific MIE ADS-1500 particle monitoring (PM) units and taking dust samples at cross sections 20 inches before the first cell and 20 inches after the last cell. At each of the two cross sections, dust samples were taken at three points: one located on the crossing of the central vertical and horizontal duct's symmetry planes and the other two on the horizontal central plane left and right of that point. Then the readings of the PM units were averaged.

The following table has dust collection efficiency results with 2 and 8 cells, depending on tension force in the ropes.

| Tension (lbs) | 2-cell efficiency (%) | 8-cell efficiency (%) |
|---|---|---|
| 25 | 7.55 | 48.86 |
| 35 | 21.45 | 60.86 |
| 45 | 7.135 | 64.18 |

The following two tables has pressure drop and heat transfer coefficient results calculated following the algorithm from "Fundamentals of Heat Exchanger Design" by Ramesh Shah and Dusan Sekulic, 2003. They were calculated for non-vibrating, stationary cylinders at different air velocities, assuming that the ropes are in staggered position and that the unit operated with air and water temps of 130 F and 80 F. The ropes' diameter is assumed to be 3 mm or 5 mm and the corresponding spacing between both the ropes in a single row and the rows themselves are 7 mm and 10 mm respectively. It should be noted that increases in heat and mass transfer due to relative movement between a fluid and a surface are also accompanied by additional pressure drop in the flow. The first table gives the pressure drop results in inches of water at different velocities with 3 mm ropes. The second table gives the pressure drop and convective heat transfer coefficient (h) for 3 mm and 5 mm ropes at air velocity of 25 ft/sec.

| #Rows (Cells) of ropes (3 mm dia) | Pressure drop in inches of water at different velocities | | |
|---|---|---|---|
| | 25 ft/s = 7.62 m/s | 30 ft/s = 9.14 m/s | 35 ft/s = 10.67 m/s |
| 3 | 0.47 | 0.65 | 0.87 |
| 6 | 0.93 | 1.30 | 1.73 |
| 8 | 1.24 | 1.74 | 2.31 |

Calculations with center-to-center distance between rows of 10 mm, Vel = 7.62 m/s (25 ft/s)
Results for different diameter ropes

| | Rope Spacing | 3 rows | | | 5 rows | | | 10 rows | | |
|---|---|---|---|---|---|---|---|---|---|---|
| | | Tot Area | PressDrop | h W/m2K | Tot Area | PressDrop | h W/m2K | Tot Area | PressDrop | h W/m2K |
| 3 mm rope | 0.007 | 4.25 | 0.47 | 256 | 7.09 | 0.78 | 275 | 14.17 | 1.55 | 289 |
| 5 mm rope | 0.010 | 4.96 | 0.60 | 243 | 8.27 | 1.00 | 261 | 16.53 | 2.00 | 274 |

±

Setting the ropes in staggered position will result in increased particulate collection efficiency at the expense of somewhat increased pressure drop. Since heat and mass transfer are enhanced by increased gas velocity and by reducing the ropes' diameter, using 3-mm ropes instead of 5-mm, staggered in eight cells, the dust collection efficiency is expected to be significantly higher than 64% obtained in the test just described.

This system can be compared with a conventional ESP. A hypothetical conventional horizontal-flow wet ESP with the rectangular inlet whose cross section is the same as in the test unit described above, i.e. it is 360 square inches (0.23 square meters). Further, assume the ESP operates at gas temperature of 140 F, with water temperature of 80 F. Further, assume that the ESP is formed by three 1.5 meters tall and 1.7 meters long plates, with the distance between the plates of 0.3 meters, with discharge electrodes in the middle. At the air speed of 25 ft/s=7.62 m/s in the inlet, i.e. of 6.36 ft/s=1.94 m/s in the ESP, the flow rate is Q=3708 acfm=1.75 m^3/s. Assume further that the ESP operates in a utility collecting fly ash, and that the fly ash migration velocity is very high, w=0.18 m/s (its typical value is 0.03-0.20 m/s). Using the Deutsch-Anderson equation η=1−exp(−wA/Q), one finds that the conventional ESP unit just described has the same efficiency η=0.64 as the 30 times smaller in volume 30×12×8 inch test unit mounted in its duct, operating at room temperature, i.e. under much less desired conditions, and without charging the particulate.

Although the present invention functions without charging the particles, in certain instances, the present invention can be incorporated into an electrostatic precipitator. Unlike the embodiment shown in FIGS. 1A and 1B, splashing liquid is undesirable in an ESP, thus, the gas velocity is lowered.

Figure 2:
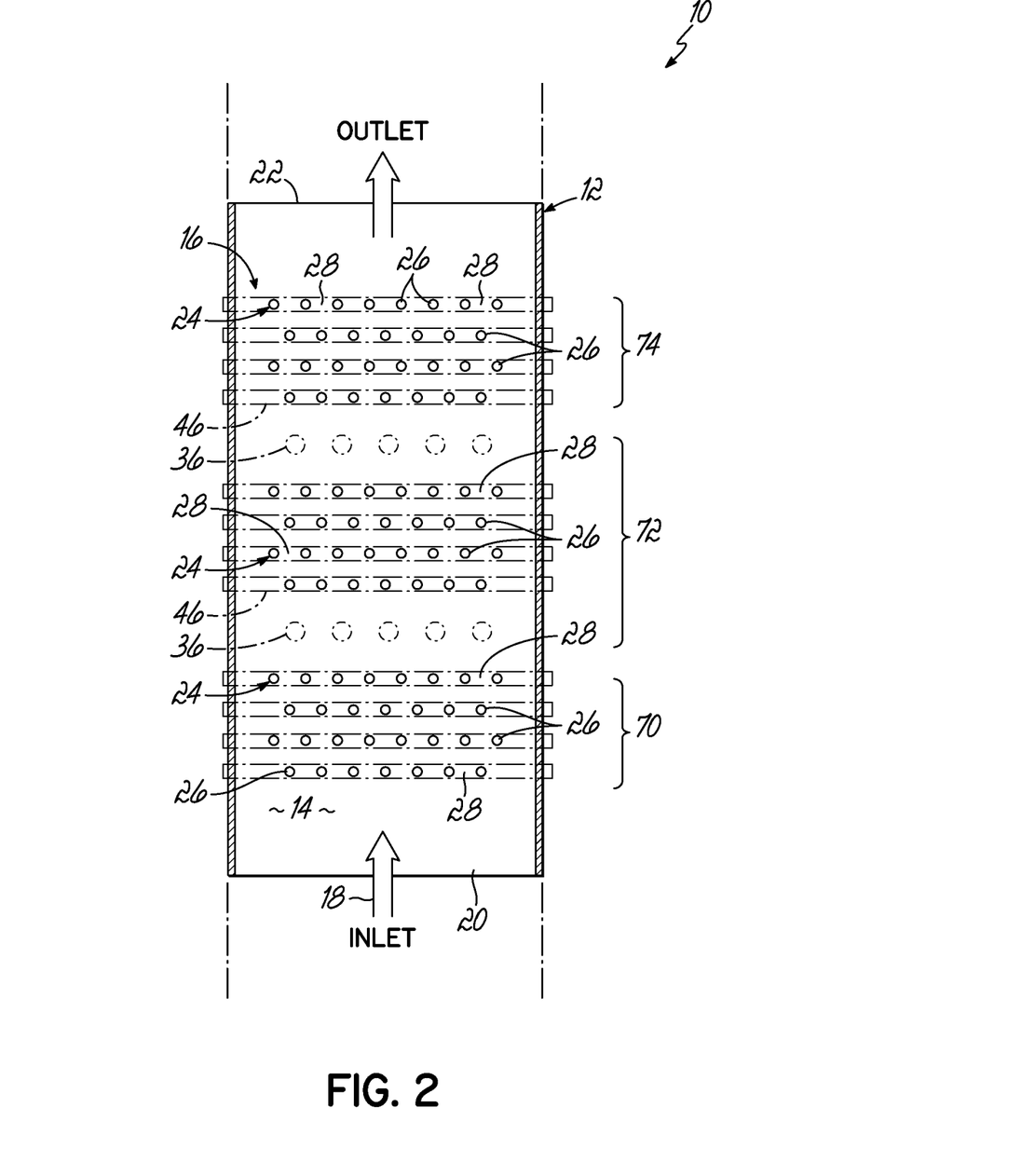
FIG. 2 is an overhead plan view of a second exemplary embodiment of a device for treating an exhaust having an array of sieves.

Further, the cords are formed from a hydrophilic material such as a hydrophilic polymer. Tuning of the cords at lower gas velocities is accomplished by reducing the cords' effective length by having several shorter cords or by restricting motion of a single rope, not only at the top and bottom, but also at one or more places in between. FIG. 2 shows an electrostatic precipitator which incorporates multiple precipitators. Precipitator device 110 includes a duct 12 having a flow chamber 14 and a sieve assembly 16. The sieve assembly 16 is positioned within the flow chamber 14 to define a flow path 18 therethrough. As shown in FIG. 2, the sieve assembly 16 can be arranged within the flow chamber 14 to coordinate a three stage method of treating an exhaust flowing through the duct 12 from a duct inlet 20 toward a duct outlet 22. This embodiment utilizes electrodes 36 to charge the particles to facilitate particulate capture. However, the electrodes are optional and not required in most applications.

According to the exemplary embodiment, the exhaust has excess thermal energy and a plurality of particulate and gaseous emissions, both of which may be removed and recovered from the exhaust during treatment. The sieve assembly 16 includes a plurality of sieves 24. As with the structure shown in FIG. 1A, each of the sieves 24 includes an elongated cord or cords 26 that partially obstructs the exhaust flowing along the flow path 18 and extends longitudinally therealong. The plurality of sieves 24 define a plurality of gaps 28 therebetween for receiving the exhaust flowing from the duct inlet 20 to the duct outlet 22. Each of the elongated cords 26 is configured to vibrate between a first position and a second position in order to generate a trailing vortex within the flow of the exhaust. As shown in FIG. 4A, the trailing vortex collects relatively small particulates flowing with the exhaust such that the particulates impact with each other to form relatively large particulates. In turn, the particulates coalesce into larger particulates that impact the elongated cords 26 for removal from the flow of exhaust. More particularly, the spacing of the cords or ropes are designed so that the vortex of a first or forward cord affects an adjacent cord as shown in FIG. 4B.

Furthermore, the sieves 24 are configured to receive a liquid, such as water or an alkali solution so that the liquid flows, by gravity and/or capillary action, along the elongated cords 26. More particularly the elongated cords 26 are formed from a liquid permeable material.—Thereby, the plurality of particulate and gaseous emissions (e.g., $NO_x$, $SO_x$, $CO_2$, and Mercury) and excess thermal energy passing through the duct 12 accumulates within the liquid for treating the exhaust, which may then be discharged to the environment. According to the exemplary embodiment, the plurality of sieves 24 recovers particulate emissions, gaseous emissions, and thermal energy from the exhaust. However, it will be appreciated that any number of sieves 24 may be used in any number of arrangements and dedicated to scrubbing and/or recovery and removal of either one or both of the emissions or thermal energy. As such, the term "treatment" is not intended to limit the invention described herein.

A first stage of treatment includes a first portion 70 of the sieve assembly 16 positioned proximate to the duct inlet 20. As such, the first stage of treatment is upstream of a second stage and a third stage of treatment, which includes second and third portions 72, 74 of the sieve assembly 16, respectively. The first stage of treatment includes the first portion 70 of the sieve assembly 16 configured to remove the plurality of particulate emissions from the exhaust via impaction and act as a scrubber, while also removing thermal energy from the exhaust. In contrast, the second stage of treatment includes the second portion 72 of the sieve assembly 16 which is electrically grounded and a plurality of discharge electrodes 36 positioned proximate to the sieve assembly 16. The plurality of discharge electrodes 36 is configured to charge particulate emissions within the exhaust. In turn, the second portion 72 of the sieve assembly 16 attracts the charged particulate emissions, which then accumulate thereon for removal from the exhaust. Finally, in the third stage of treatment, the third portion 74 of the plurality of sieves 24 repeats the first stage of treatment for a final recovery of particulate emissions and thermal energy. Any liquid and condensate that may form on the sieve assembly 16 may be recycled and reused for future treatment of additional exhaust as discussed below in greater detail.

With respect to the plurality of discharge electrodes 36, it will be appreciated that the particulate emissions are generally given a negative electrical charge by passing these particulate emissions through a region in which gaseous ions flow (i.e., a corona). More specifically, an electrical field forms between the discharge electrodes 36 and the grounded elongated cords 26, which is conductive due to the liquid flowing therealong. Each of the discharge electrodes 36 is operatively connected to an electrical current supply in order to maintain a high voltage between the discharge electrodes 36 and the elongated cords 26, which act as a collection electrode. Thus, it will be appreciated that the precipitator device further includes electrical equipment as well, for generating a high-voltage supply, such as a high-voltage transformer and a rectifier. These and other components may be operatively connected to the discharge electrodes 36 and elongated cords 26 as is presently understood in the state of the art. Alternatively, each of the sieves 24 may further include a collection electrode, such as a frame member positioned proximate to the elongated cords 26, which may be electrically grounded for attracting the charged particulate emissions. It will be further appreciated that the corona may be positively charged as well and, in this respect, any charge may be used in accordance with the invention described herein. As such, the invention is not intended to be limited only to the negative charges discussed above.

FIGS. 6 and 7 show an alternate embodiment of the present invention, the vertical-flow wet vibrating precipitator in which the airflow starts at a horizontal flow and changes to a vertical flow. As shown in FIG. 6, separator 80 includes a duct 82 which includes a horizontal gas inlet 84 and a vertical gas outlet 86. The duct 82 includes the horizontal duct portion 88, which leads to vertical duct portion 90. The duct incorporates a separation unit 92 which includes a plurality of cords 94 similar to cords 24 in FIGS. 1 and 2. These are stretched at an incline between a water inlet 96 and sidewall 98 of the duct 82. A water collection trough 100 is located at the ends of cords 94 and directs water 102 which falls from the cords 94 down the vertical portion 90 of duct 82 and across the horizontal portion 88 to a water collection trough 104.

A pump 106 directs the water from trough 104 through conduit 108 in the direction arrows 110 back to the water source 96. As in the previous embodiments recirculated liquid may be first pass through a heat exchanger. Thus, in operation, as air is introduced into inlet 84, it will pass through dropping water 102, which will cause the particles to combine in droplets of water, forming larger particles. The air will then pass upwardly through horizontal passage 90, through the sieves formed by cords 94. The water introduced into inlet 96 will run down and through cords 94 towards sidewall 98. As the water moves downwardly, along with the angled cords, it will drop into trough 100, which includes a plurality of holes 101, which allow the collected water to drip into trough 104 as shown by arrows 102. Again, in this embodiment, the cords 94 are designed to vibrate and create a trailing vortex. This is achieved by selecting the appropriate cord material, length and tension relative to the airflow through the sieve assembly 92.

Thus, this embodiment incorporates both a curtain of water shown by arrows 102 which facilitates the agglomeration of the smaller particles into larger particles while, at the same time, providing the vibrating sieve assembly 92 according to the present invention.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination.

What is claimed is:

1. A sieve assembly for treating an exhaust, comprising;

a plurality of sieves arranged relative to each other to define a plurality of gaps therebetween for receiving the exhaust therethrough, each of the sieves including an elongated cord longitudinally extending therealong and configured to transversely vibrate between a first position and a second position such that each of the elongated cords generates a trailing vortex within the exhaust for collecting a plurality of particulates within the trailing vortex.

2. The sieve assembly of claim 1, further comprising:

a first support member and an opposing second support member, the plurality of sieves connected to and extending between the first and second support members such that each of the elongated cords is held in tension therebetween.

3. The sieve assembly of claim 2, wherein each of the elongated cords is held in a predetermined tension such that each of the elongated cords is configured to vibrate by directing a flow of the exhaust transversely therealong.

4. The sieve assembly of claim 1, further comprising:

a first support member defining a liquid supply conduit configured to receive the liquid, the plurality of sieves projecting from the support member such that each of the elongated cords is fluidly connected to the liquid supply conduit to receive the liquid and pass liquid therealong as each of the elongated cords vibrates.

5. The sieve assembly claimed in claim 4 further comprising a liquid collector connected to a heat exchanger.

6. The sieve assembly of claim 4, wherein each of the elongated cords are formed from a hydrophobic material.

7. The sieve assembly of claim 1, wherein each of the elongated cords is formed from a wire rope.

* * * * *

UNITED STATES PATENT AND TRADEMARK OFFICE
CERTIFICATE OF CORRECTION

PATENT NO.         : 10,625,197 B2
APPLICATION NO.    : 15/568036
DATED              : April 21, 2020
INVENTOR(S)        : Hajrudin Pasic et al.

It is certified that error appears in the above-identified patent and that said Letters Patent is hereby corrected as shown below:

On the Title Page

Column 2, Abstract, Line 10, "space" should be --spaced--.

Column 2, Abstract, Line 11, "subsequently" should be --subsequent--.

Column 2, Abstract, Line 13, "heat exchanger" should be --heat exchanger,--.

In the Specification

Column 1, Line 18, "treating an exhaust, and" should be --treating an exhaust and,--.

Column 2, Lines 41-45, "(A) as a particulate capture instrument due to (I) high impaction efficiency (I) particle growth, (ii) increase in turbulence shear (iii) generation of water droplets that act as a scrubber for the particles, and (iv) increased evaporation" should be --(A) as a particulate capture instrument due to (i) high impaction efficiency, (ii) particle growth, (iii) increase in turbulence shear, (iv) generation of water droplets that act as a scrubber for the particles, and (v) increased evaporation--.

Column 2, Line 47, "(III)" should be --(iii)--.

Column 3, Line 58, "shows" should be --show--.

Column 6, Line 5, "buy" should be --by--.

Column 9, Line 25, replace with
$v_{max} = A\,\omega_v,\ m/s \qquad a_{max} = A\,\omega_v^2,\ m/s^2 \qquad (8)$ Column 11, Line 2, "is the goal the" should be --is the goal of the--.

Signed and Sealed this
Twenty-third Day of June, 2020

Andrei Iancu
*Director of the United States Patent and Trademark Office*

CERTIFICATE OF CORRECTION (continued)
U.S. Pat. No. 10,625,197 B2

Column 11, Line 9, "produces" should be --produce--.

Column 11, Line 34, "$V_v$=0.03 m/s The vibrational" should be --$V_v$=0.03 m/s. The vibrational--.

Column 11, Lines 48-49, "D is the diameter of the string, is the kinematic viscosity" should be --D is the diameter of the string, v is the kinematic viscosity--.

Column 11, Line 54, "numbers" should be --number--.

Column 12, Line 49, "has" should be --have--.

Column 13, Line 23, "±" should be removed.

Column 14, Line 40, "are designed" should be --is designed--.

Column 14, Line 49, "accumulates" should be --accumulate--.

Column 14, Line 52, "recovers" should be --recover--.

Column 15, Line 59, "in the direction arrows" should be --in the direction of arrows--.

Column 15, Line 61, "may be first pass" should be --may first pass--.

In the Claims

Column 16, Line 28 (Claim 1), "comprising;" should be --comprising:--.

Column 16, Line 58 (Claim 6), "are formed" should be --is formed--.